Figure 1:
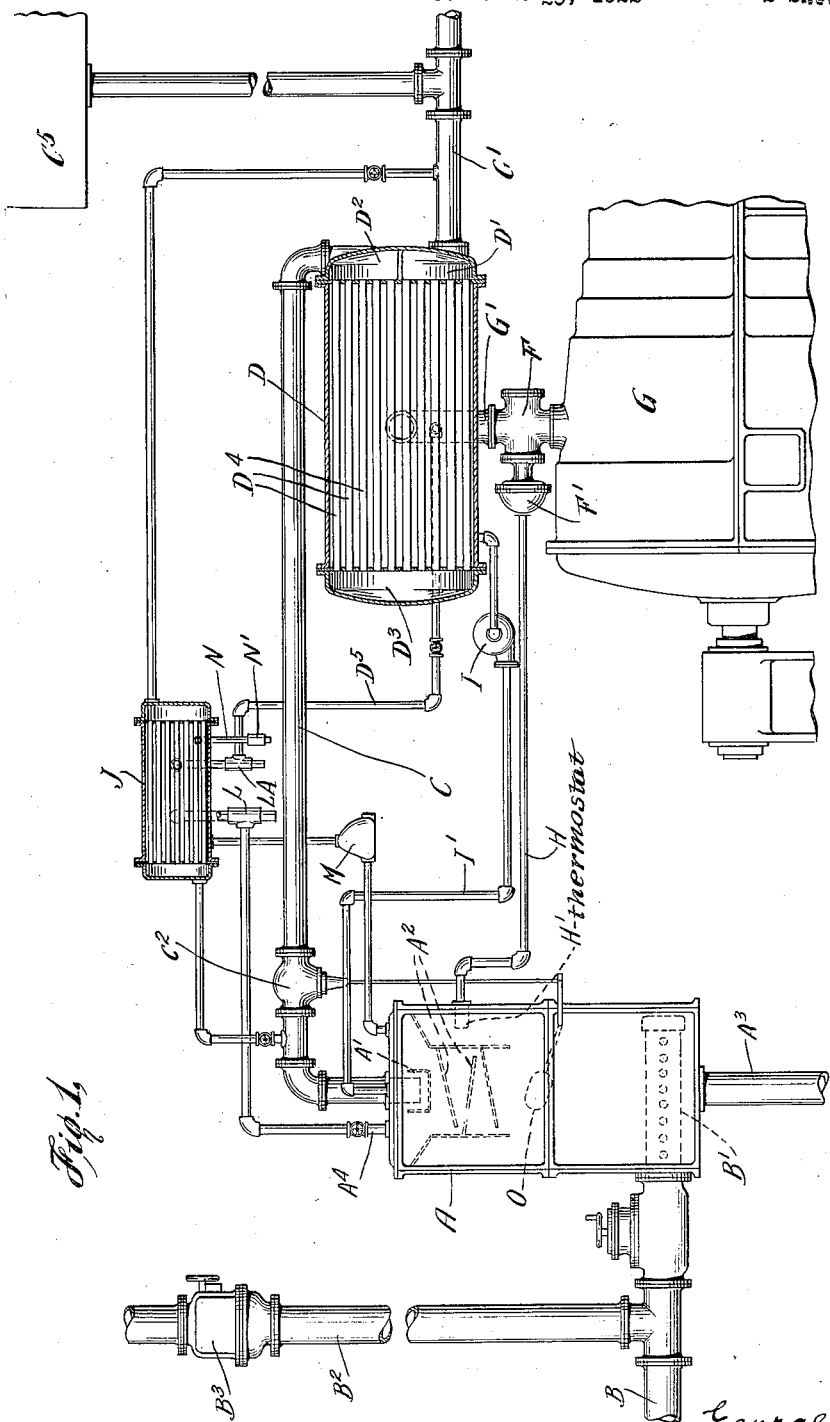

Aug. 30, 1927.  
G. H. GIBSON  
HEATING BOILER FEED WATER  
Filed June 29, 1922

1,641,138  
2 Sheets-Sheet 1

INVENTOR
BY George H. Gibson
John E. Hubbell
his ATTORNEY

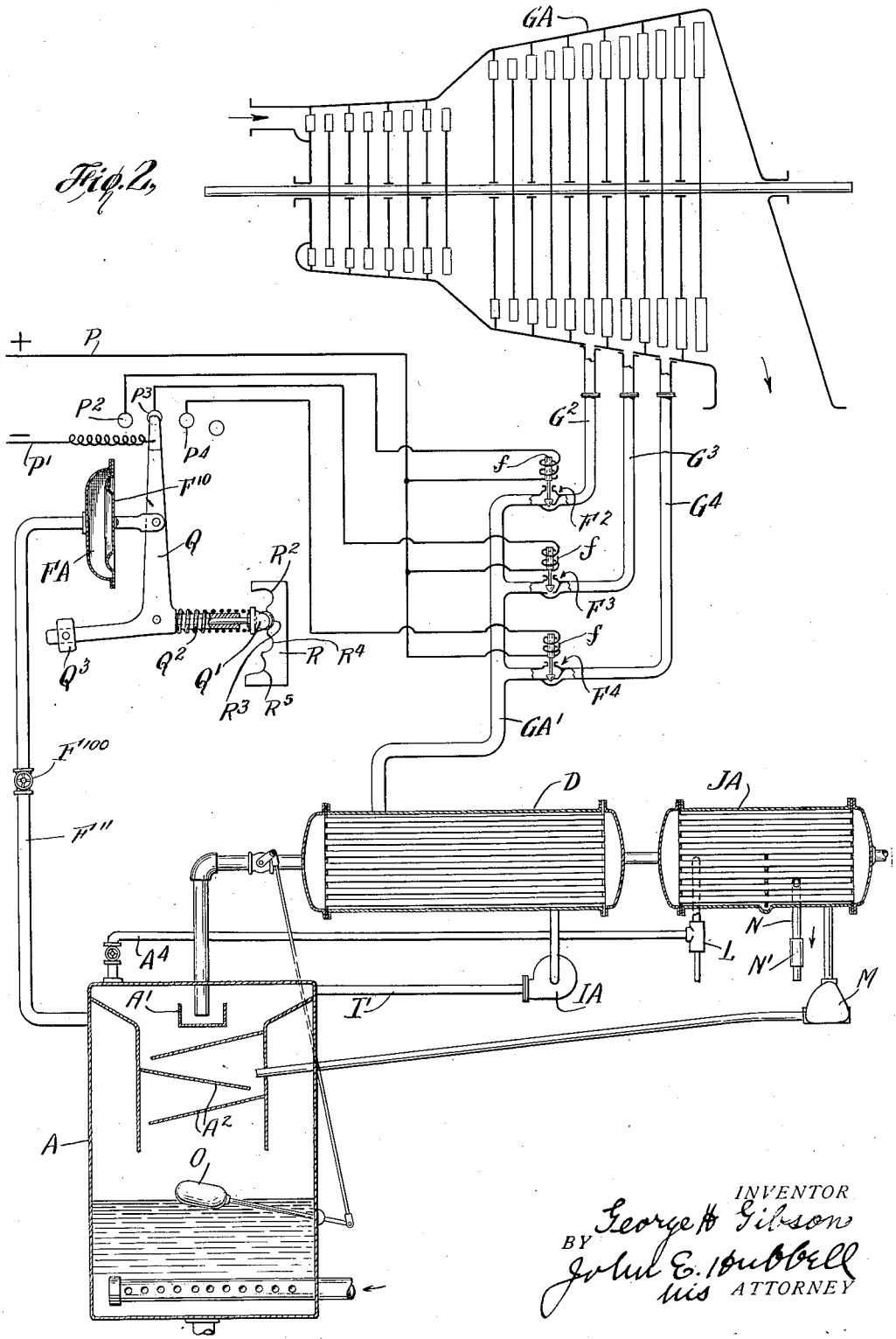

Patented Aug. 30, 1927.

1,641,138

UNITED STATES PATENT OFFICE.

GEORGE H. GIBSON, OF MONTCLAIR, NEW JERSEY.

HEATING BOILER FEED WATER.

Application filed June 29, 1922. Serial No. 571,632.

The general object of my present invention is to provide effective means for the efficient use of steam available from two sources in preheating boiler feed water to or above a predetermined temperature in a power plant in which the available steam from one of the sources is all advantageously employed in preheating the water, but is insufficient in amount, during a portion of the time at least, to heat the feed water to the desired temperature, and steam from the other source or sources is employed to give the additional heat required to heat the feed water to the desired temperature. The invention is primarily intended for use in a power plant in which the exhaust steam available from auxiliaries is all utilized so far as possible in preheating the boiler feed water, and the additional heat required is furnished by steam bled from an intermediate stage of a turbine, or by steam otherwise supplied which if not used in preheating boiler feed water might be directly utilized in the production of mechanical energy.

The various features of novelty which characterize my invention are pointed out with particularity in the claims annexed to and forming a part of this specification. For a better understanding of my invention, however, and of its advantages and specific objects attained with its use, reference should be had to the accompanying drawing and descriptive matter in which I have illustrated and described an embodiment of my invention.

Of the drawings:

Fig. 1 of the drawings is a somewhat diagrammatic elevation of a portion of a power plant; and Fig. 2 is a view taken similarly to Fig. 1 illustrating a modified arrangement.

In the arrangement shown in the drawing, the feed water is delivered by a supply pipe C' to the inlet of a primary heater D and passes from the outlet of the latter through a pipe C to the inlet of a secondary heater A. $C^5$ represents a surge tank connected to the pipe C'. The heater A is of the open feed water type, and preferably, as shown, is a deaerating heater of the type in which the water inlet is at the top of the heater, and provisions are made for passing the water in finely divided or broken streams through a vapor space in the upper portion of the heater chamber into the body of water in the reservoir space formed by the lower portion of the heater chamber. Said provisions, in the form illustrated, comprise an overflow trough A' receiving the water supplied to the heater by the pipe C, and baffles or trays $A^2$ located beneath the receptacle A'. $A^3$ represents the water outlet from the heater A, and $A^4$ represents an air outlet from the heater. Exhaust steam is supplied to the heater A by a pipe B, which, in the preferred construction illustrated comprises a perforated portion B' within the heating chamber through which the steam is discharged into the body of water within the heater A. The pipe portion B' is preferably located well below the water level in the heater A. The water level is regulated by a float O connected to and actuating a throttle valve $C^2$ in the water supply pipe C. As shown the exhaust steam supply pipe B is provided externally of the heater A with a branch $B^2$ including a back pressure valve $B^3$ through which exhaust steam may be discharged into the atmosphere, if and when this is necessary to avoid an undesirable building up of pressure in the exhaust steam line and heater A. The air inlet $A^4$ from the heater A may discharge directly into the atmosphere but to avoid loss of heat contained in the air and vapor mixture leaving the heater through the outlet $A^4$, I advantageously connect the air outlet $A^4$ to an air cooler or auxiliary J which as shown is cooled by a portion of the water supplied to the heater A. In the arrangement shown the cooler J is connected in a bypass about the heater D and a portion of the pipe C including the valve $C^2$. As shown a jet exhauster L is provided for drawing air and gas from the heater A through the air outlet $A^4$, but no exhausting device is required for this purpose when, as will ordinarily be the case, the pressure maintained in the heater A is slightly above that of the atmosphere. Water of condensation formed in the intertube space of the cooler J is passed back to the heater A through a trapped connection M. N represents an air vent to the atmosphere from the intertube space of the cooler J. This vent may or may not be provided with an ordinary thermostatic air valve N'.

In the contemplated mode of operation of the heater A, the water passing through the heater is normally heated to its final temperature in its passage through the vapor space of the heater by steam rising from the surface of the body of water in the lower reservoir portion of the heater. In consequence the steam discharged through the perforated pipe B' is not condensed in the body of water into which it is discharged but agitates the latter and sweeps out of the latter any air entrained therein. The deaerating heater A comprises novel features invented by me but not claimed herein as they are claimed in my co-pending application, Serial No. 523,547, filed December 19, 1921.

Advantageously the primary heater D is a closed heater, and as shown, comprises end chambers D' and D², to which the pipes C' and C are connected, and an end chamber D³ connected to the chambers D' and D by tubes D⁴ through which the water supplied to one end chamber by the pipe C' passes to the other end chamber. Steam for heating water passing through the heater D is supplied to the intertube space of the heater by a bleeder pipe G' leading from an intermediate stage of the steam turbine G. The provisions shown for disposing of the water of condensation formed in the intertube space of the heater D comprise a pump I having its delivery pipe I' discharging into the heater A. Air entering the intertube space of the heater D may be passed into the cooler J by the pipe connection D⁵ and ejector LA. The supply of steam from the turbine G to the heater D through the pipe G' is automatically proportioned to the heat requirements of the feed water heating system by means of an automatic control valve F. The latter, in the form shown, comprises a fluid pressure motor F' of well known type and adapted to open or close the valve F accordingly as the pressure in the pipe H running to the motor F' falls below or rises to a predetermined value. As shown the pipe H is connected to a thermostat H' of the volatile liquid type located in the heater A, so that the pressure transmitted to the motor F' is a measure of the temperature in the heater A.

With the described arrangement, all of the steam furnished by the pipe B is utilized in the heater A in preheating and deaerating the water passing through that heater. The steam thus supplied through the pipe B may be exhaust steam from various plant auxiliaries. Those skilled in the art will understand that the available exhaust steam from the auxiliaries will not necessarily or ordinarily fluctuate in exact proportion with the demand for boiler feed water. In some plants in which my invention may be advantageously employed, the exhaust steam thus supplied to the heater A may be sufficient to preheat the boiler feed water to the desired temperature during most, but not all of the time, while in other plants in which my invention may be used with advantage, the supply of exhaust steam from the auxiliaries is continuously or at least for most of the time insufficient to preheat the boiler feed water to the desired temperature. In either event the automatic control of the amount of steam bled from the turbine G into the heater D, insures the use of the exact amount of steam from that source required to prevent the temperature in the heater falling below a predetermined minimum. The system thus insures an adequate supply of properly heated and deaerated water without at any time withdrawing more steam from the turbine G than is required for the purpose.

In some cases it may be desirable to supply the heat requirements of the primary heater by means of steam taken from one or another of a plurality of sources according to the amount of heat required by the primary heater. For example, when the steam utilized in the primary heater is bled from a steam turbine, a better efficiency may be had by taking this steam from one intermediate stage of the turbine when a comparatively small amount of heating is required in the primary heater, and from a higher pressure stage of the turbine when a greater heating effect in the primary heater is required, than can be secured by taking all the steam used in the secondary heater from a single stage of the turbine.

An arrangement of this sort is illustrated in Fig. 2. The arrangement of Fig. 2 is generally like that shown in Fig. 1, except that the steam supplied to the primary heater D is taken at one time or another, as hereinafter explained, from three different stages of the turbine GA through the separate bleeder outlets G², G³, and G⁴ which are connected to the common steam supply connection GA' of the heater D through valves F², F³ and F⁴, respectively. As shown the valves F², F³ and F⁴ are electromagnetically operated, and each of these valves is open only when its corresponding electromagnet f is energized. The electromagnets f of the different valves F², F³ and F⁴ are energized from supply lines P and P' according to whether the contact arm Q is in contact with one or another of the contacts P², P³ and P⁴, respectively. The arm Q is automatically actuated in direct response to the pressure in the secondary heater A, and thereby indirectly in response to the temperature therein, by means of a connection between the arm Q and the flexible diaphragm F¹⁰ of the fluid pressure motor FA which is internally connected to the interior of the heater A. A spring pressed follower Q' which with its actuating spring Q² is mounted on the switch arm Q, cooperates with the notches R², R³, R⁴ and R⁵, of the plate R to hold the lever Q in contact with one or another of the contacts P², P³ and P⁴, or in a fourth position in which it engages none of these contacts. The plate R and follower Q' thus prevent the arm Q from stopping in an intermediate position. When the pressure in the heater A falls below, or rises above a predetermined value, which is fixed by the adjustment of the adjustable counterweight Q³ carried by the lever Q, the latter is turned by the motor FA to supply or to increase the supply of steam to the heater D from the turbine G, or to decrease or cut off this steam supply, and thereby tends to maintain a constant pressure in the heater A. Advantageously an adjustable throttle valve F¹⁰⁰ is provided in the pipe F¹¹ connecting the motor FA to the heater A whereby the response of the motor FA to fluctuations in the heater A may be made more or less sluggish as conditions make desirable.

Aside from the differences already noted, the apparatus shown in Fig. 2 differs in construction and operation from that shown in Fig. 1 only in that the air cooler JA is traversed by all of the raw water passing through the primary heater D, and in that a wet air pump IA is employed to pass both water of condensation, and air from the intertube space of the primary heater D into the secondary heater A. As those skilled in the art will understand, with the described mode of operation of the heater A, the temperature of the water in the lower portion of the heater will be the same as the temperature of the steam rising from the upper surface of that body of water and passing into contact with the water flowing down over the trays A², and the same as the temperature of saturated steam at the pressure in the vapor space of the heater A. In consequence the thermostat H', located as shown in Fig. 1, operates the fluid pressure motor F' in response to the heater temperature in substantially the same manner as it would if the thermostat were immersed in the body of water in the lower portion of the heater and just as the fluid pressure motor FA is responsive to the temperature as the heater A of Fig. 2, as a result of the transmission of the vapor pressure in the heater to the chamber of the motor FA.

The apparatus shown in Fig. 2 is especially well adapted for use where the final temperature of the water leaving the secondary heater A is appreciably below 212°.

While in accordance with the provisions of the statutes I have illustrated and described the best form of my invention now known to me, it will be apparent to those skilled in the art that changes in form may be made without departing from the spirit of my invention as set forth in the appended claims, and that certain features of my invention may sometimes be used to advantage without a corresponding use of other features.

Having now described my invention, what I claim as new and desire to secure by Letters Patent, is:

1. In a feed water heating system, the combination with a primary heater, a secondary heater, separate steam supply connections to each heater, and means for passing the water to be heated first through the primary heater and then through the secondary heater, of a means responsive to the temperature in the secondary heater for regulating the supply of steam to the primary heater.

2. In a feed water heating system, the combination with a primary heater, of an open secondary heater provided with an air outlet, means for passing the water to be heated through the primary heater into the secondary heater, an exhaust steam supply connection to the secondary heater, a separate steam supply connection to the primary heater, and means regulating the supply of steam to the primary heater through the last mentioned connection in automatic response to the temperature in the secondary heater.

3. In a power plant comprising a steam turbine and an exhaust steam line, a feed water heating system comprising a primary heater, a secondary heater, means for passing the feed water to be heated first through the primary heater and then through the secondary heater, a connection from the exhaust steam line to the secondary heater, and means responsive to the temperature in the secondary heater for bleeding steam from said turbine into said primary heater as required to maintain an approximately constant temperature in the secondary heater.

4. In a feed water heating system, the combination with a primary heater, of a secondary heater, means for passing the water to be heated through the primary heater into the secondary heater, an exhaust steam supply connection to the secondary heater, and means for supplying steam to the primary heater from sources of steam at different pressures, comprising a selective valve mechanism including provisions responsive to the temperature in the secondary heater, for connecting said primary heater to one or another of said other sources of steam.

5. In a feed water heating system, the combination with a primary heater, of a secondary heater, means for passing the water to be heated through the primary heater into the secondary heater, an exhaust steam supply connection to the secondary heater, a plurality of sources of steam at different pressures, and means responsive to the temperature in the secondary heater for establishing and interrupting communication between said sources of steam and primary heater so as to maintain an approximately constant temperature in said secondary heater.

Signed at Philadelphia in the county of Philadelphia and State of Pennsylvania this twenty seventh day of June A. D. 1922.

GEORGE H. GIBSON.